Sept. 1, 1931.  H. ADDISON ET AL  1,821,870
NAVIGATING INSTRUMENT
Filed Sept. 6, 1927  4 Sheets-Sheet 1

Inventors
HERBERT ADDISON,
WILLIAM BLAINE LUARD,

Sept. 1, 1931.  H. ADDISON ET AL  1,821,870
NAVIGATING INSTRUMENT
Filed Sept. 6, 1927   4 Sheets-Sheet 2

Sept. 1, 1931.  H. ADDISON ET AL  1,821,870

NAVIGATING INSTRUMENT

Filed Sept. 6, 1927  4 Sheets-Sheet 3

Inventors
HERBERT ADDISON,
WILLIAM BLAINE LUARD,
By Toulmin & Toulmin,
Attorneys Sept. 1, 1931.   H. ADDISON ET AL   1,821,870
NAVIGATING INSTRUMENT
Filed Sept. 6, 1927   4 Sheets-Sheet 4

Inventors
HERBERT ADDISON,
WILLIAM BLAINE LUARD,
By Toulmin & Toulmin,
Attorneys Patented Sept. 1, 1931

1,821,870

UNITED STATES PATENT OFFICE

HERBERT ADDISON, OF WORTHING, AND WILLIAM BLAINE LUARD, OF FALMOUTH, ENGLAND

NAVIGATING INSTRUMENT

Application filed September 6, 1927, Serial No. 217,708, and in Great Britain September 8, 1926.

This invention relates to navigating instruments, and has for its object to provide a new and improved instrument of this kind particularly applicable to aircraft.

The instrument according to this invention is more particularly adapted for determining the direction and velocity of the wind by an observer in an aeroplane or airship, but is also adapted for solving various other problems of an analogous nature, or dependent upon the determinations of the said factors. In all cases the factors which are to be determined may be read off, after the necessary initial adjustments have been made, immediately and simultaneously from the scales provided on the instrument without any necessity for making calculations.

In order that the nature of the invention may be clearly understood, embodiments of the same are illustrated in the accompanying drawings, in which.

Figure 1:
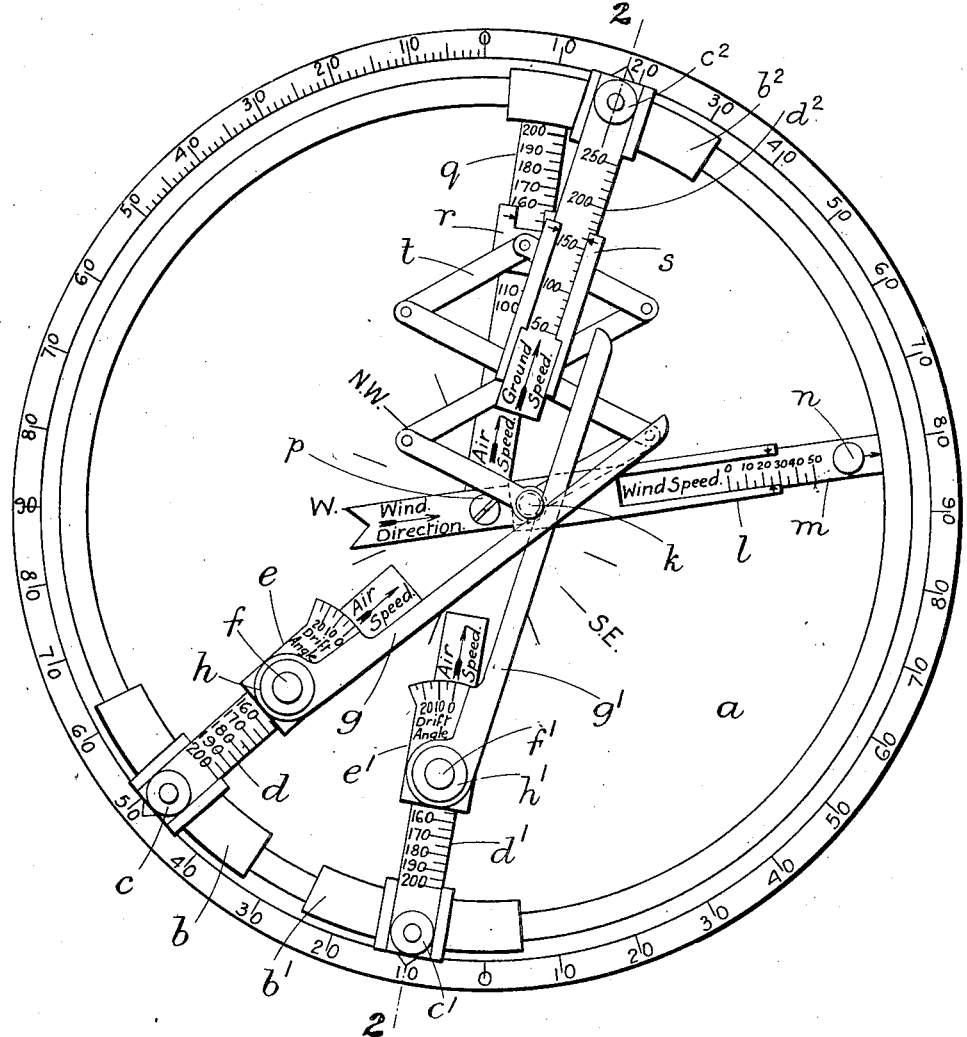
Fig. 1 is a top plan view of an instrument in accordance with the invention, the cover of which is removed.
Figure 2:
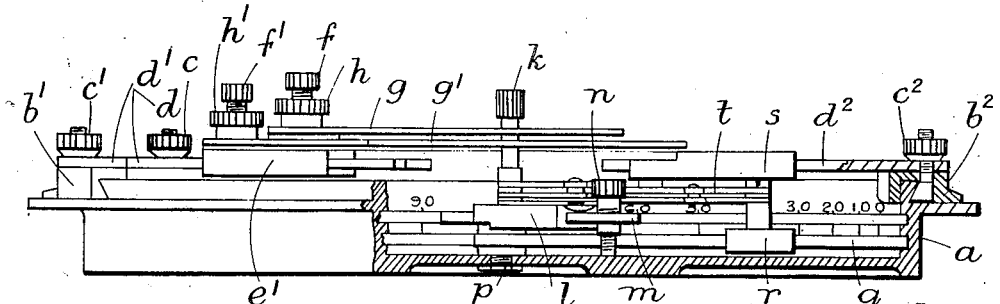
Fig. 2 is a part section on the line 2—2 of Fig. 1.

Referring to Figs. 1 and 2 of the drawings, the instrument illustrated consists of a circular base $a$ in the form of a shallow cup-shaped part having a flanged edge. Three circumferentially moving saddles or slides $b$, $b'$, and $b^2$, are arranged to slide upon the raised upper edge of the base $a$, and these saddles or slides may be locked in any desired circumferential position, by the clamping screws $c$, $c'$ and $c^2$ respectively.

Each of the saddles $b$, $b'$, $b^2$ has an arm projecting radially inwards as indicated at $d$, $d'$, $d^2$ respectively. Each of the two arms, $d$, $d'$ carries a slider or cursor $e$, $e'$ respectively, which can be locked in any position along the arm by its clamping screw $f$, or $f'$. Pivoted to the cursor $e$ is a blade or auxiliary arm $g$ while a similar blade $g'$ is pivoted to the cursor $e'$, both of the blades $g$ and $g'$ being capable of angular movement relatively to the cursors and each being provided with a clamping screw, as indicated at $h$ and $h'$.

Two additional arms $m$ and $q$ are connected by a pivot $p$ to the centre of the base $a$, the outer ends of the arms $m$ and $q$ being preferably supported by grooves formed in the internal surface of the rim of the base $a$, as shown on the right of Fig. 2. The arm $m$ can be locked in any desired radial position by a clamping screw $n$, and carries a cursor $l$ which can be locked in any desired position upon the arm by clamping screw $k$.

Arm $q$ is provided with a cursor $r$ and arm $d^2$ with a cursor $s$. The relative position of the three cursors $l$, $s$ and $r$ on their respective arms $m$, $d^2$ and $q$ is determined by means of the pantograph $t$ which is pivotally connected to the said three cursors in the manner shown in our co-pending patent application No. 135,688 filed on the 15th September 1926.

In the form shown the instrument is adapted for the navigation of aircraft, and the three arms $d$, $d'$ and $q$ are therefore graduated in units of air speed, while arm $m$ is graduated in units of wind speed and arm $d^2$ in units of ground speed. The cursors $e$ and $e'$ are graduated in degrees of drift angle.

The upper face of the outer flange of base $a$ is graduated in degrees similarly as in the case of a compass card, and similar graduations are formed on the vertical inner face of the rim of the said base $a$, while the points of the compass (N. E. S. W. and so forth) are marked on the flat upper face of the base.

The various uses to which the instrument shown in Figs. 1 and 2 can be put will be understood from the following examples:—

Example 1

It is desired to determine the force and direction of the wind from observations made from an aeroplane flying over uncharted country or over the sea.

The operations to be performed by the observer are as follows:—

One of the arms $d$ or $d'$ is set to a position on the circular scale corresponding to the compass course steered by the air craft, the respective cursor $e$ or $e'$ is then set to the position on the arm corresponding to the air speed of the aircraft as shown by the air speed indicator, and the corresponding blade $g$ or $g'$ is set to the position corresponding to the "drift angle" as observed by any convenient means. The clamping screws $f$ and $h$ or $f'$ are then tightened.

The navigator now alters the course through a small angle and sets the remaining arm, cursor, and blade to the positions corresponding to the new compass course, air speed, and drift angle respectively.

Arm $m$ and cursor $l$ are then adjusted until the clamping screw $k$ touches the two blades $g$ and $g'$. The speed of the wind can now be read directly from the position of the index mark of the cursor $l$ on the scale of the arm $m$, and the direction of the wind from the position of $m$ on the compass scales on the base $a$.

Example 2

It is desired to determine the compass course to be steered and the ground speed to be made good to maintain a given ground course.

The force and direction of the wind having been obtained, either by the method described above or from meteorological or other information, received, the arm $m$ and cursor $l$ are clamped in their corresponding positions by their respective clamping screws $n$ and $k$. Arm $d^2$ is then set to the position corresponding to the ground course to be made good and is clamped by the screw $e^2$. Cursor $r$ is moved to the position on the arm $q$ corresponding to the air speed. The compass course to be steered is then read from the position of arm $q$ and the ground speed made good from the position of the cursor $s$ on the arm $d^2$.

In the apparatus hereinabove described the positions of the arm $m$ and cursor $l$ are determined by bringing the screw $k$ into contact with the blades $g$ and $g'$, but the velocity and direction of the wind may be obtained, if desired, by sighting directly past the intersections of the said blades on to a scale on the arm $m$, or directly on to circumferential and radial graduations on the base $a$.

It is possible to combine either of the arms $d$ or $d'$ with the arm $q$ in a single element, and also to combine the degree scale on cursor $e$ or $e'$ with the arm $q$ or $d^2$ in a single element, and to so arrange the parts that when the arms, cursors, or index marks representing known quantities, are set to the corresponding graduations of their respective scales, the elements representing the whole of the remaining quantities are automatically caused to assume positions enabling the values of these remaining quantities to be immediately and simultaneously read off from their respective scales without any necessity for further manipulation.

These advantages are obtained with the modified construction shown in Figs. 3–5 which will now be described.

Figure 5:
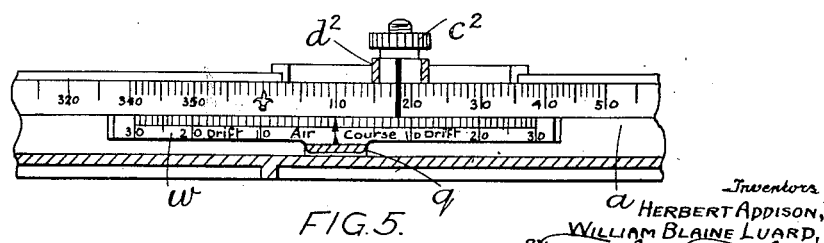
Fig. 5 is a sectional elevation on the line 5—5 of Fig. 3.

Referring to the said figures, considered in conjunction with Fig. 1, it will be seen that the drift angle scale on the cursor $e$ of Fig. 1 is replaced by a drift angle scale attached directly to the arm $q$ and indicated at $w$ in Fig. 5. Further, the blade or auxiliary arm $g$ pivoted on the cursor $e$ of Fig. 1 is here shown in the form of a pivoted extensible link consisting of the parts $g$, $g^2$ and $g^3$; of these parts, $g$ is pivoted below the cursor $e$ and has above the cursor a loop or stirrup bearing an index mark working in conjunction with the drift scale on cursor $e$, the lower port of $g$ having a slot for the reception of the straight hollow telescopic member $g^2$, which itself receives the telescopic member $g^3$ pivoted to pivot $k$ on cursor $l$. The construction ensures that the angle shown on the drift scale on cursor $e$ is always the angle between the axis of the arm $d$ and the line joining the pivots on cursors $e$ and $l$ irrespective of the distance between these pivots. Alternatively, a non-extensible link may be used, pivoted on $e$ and having a slot working on pivot $k$, as in Fig. 6. This simplification enables the values of the whole of the vector quantities represented by the apparatus to be read off from their respective scales without any necessity for further manipulation, and also enables the whole of the parts $b'$, $d'$, $c'$, $e'$, $f'$, $g'$, $h'$ to be entirely dispensed with.

With this simplified form of the instrument the procedure to be carried out by a pilot desiring to obtain the force and direction of the wind when flying over uncharted country is as follows: Set arm $q$ to the compass course steered; set cursor $r$ to the air speed; set arm $d^2$ so that the reading on drift angle scale $w$ agrees with the observed drift angle.

The pilot now alters his course slightly and proceeds to: Set arm $d$ to the new course; set cursor $e$ to the new air speed; and then, while keeping $q$, $r$ and $d^2$ fixed, he rotates arm $m$ until the index mark on $g^3$ agrees with the scale reading on the auxiliary drift scale on $e$, corresponding with the observed new drift angle.

The pilot can now read off directly (1) wind speed from cursor $l$; (2) wind direction from arm $m$; (3) ground speed from cursor $s$; (4) ground course from the arm $d^2$ (by sighting through the opening in the arm on to the scale on interior of the rim $a$).

The following explanation will show how the simplified construction enables the parts $b'$, $c'$, $d'$, $e'$, $f'$, $g'$, $h'$, referred to above, to be dispensed with. Referring to Fig. 1 supposing that the arms $q$ and $d'$ are arranged diametrically opposite to one another, and that the cursors $e'$ and $r$ are set to the same reading; also that the angle between the arms $q$ and $d^2$ is the same as the drift angle on cursor $e'$. Then, if cursor $r$ and arm $q$ are fixed, and elements $l$ and $m$ are left free, the pivot $k$ will be constrained to move parallel to the arms $g'$ and $d^2$, by reason of the mathematical laws governing the operation of the pantograph. In other words, in some cases the arm $g'$ is redundant, and all the parts connected therewith and referred to above can be dispensed with. In all forms of the instrument, clamping devices may be provided for any of the movable elements.

Figure 6:
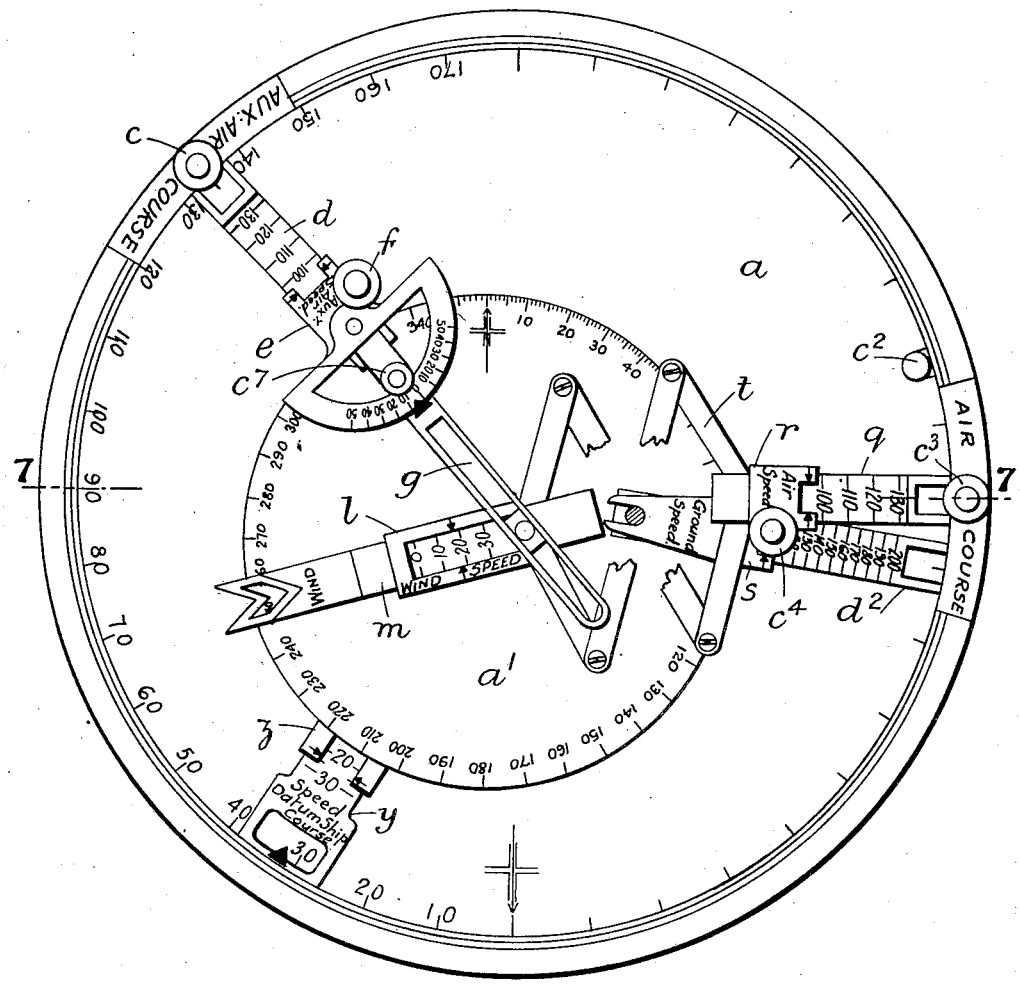
Fig. 6 is a top plan view of another modification of the instrument shown in Fig. 1.
Figure 7:
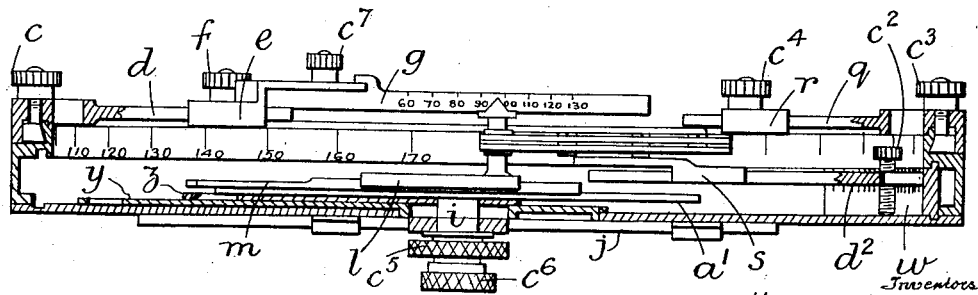
Fig. 7 is an elevation partly in section on the line 7—7 of Fig. 6, the arms being supposed, for the sake of clearness, to be all turned into the plane 7—7.
Figure 8:
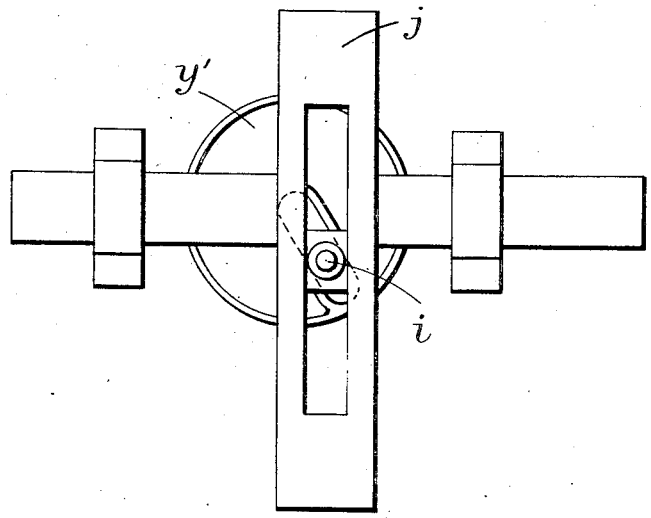
Fig. 8 is an inverted plan view of certain parts shown in Figs. 6 and 7.

Referring now to Figs. 6, 7 and 8, the form of the invention shown herein is adapted more particularly for use when it is necessary to make observations from an aircraft upon moving objects. The object may be moving either upon land or water, or in the air, at a speed and in a direction capable of being readily ascertained, but for the purpose of illustration it will be referred to in the following description as the "datum ship".

In addition to the four arms $q$, $d^2$, $m$ and $d$, an arm $y$ is provided adapted to move about the central axis of the graduated base $a$ and having a cursor $z$. In this form the arm $m$ is arranged to rotate about an axis parallel with that of the base $a$ but displaceable relatively thereto, while co-axial with the axis of arm $m$ is a circular degree scale $a'$ which can be moved so that successive positions of a given diameter of the scale remain parallel with one another. The cursor $l$ on the arm $m$ is adapted to be connected with the cursors $r$, $s$ and $e$ by a link mechanism. The cursor $e$ carries a degree scale arranged coaxially with the pivot of the cursor and arm $d^2$ carries a degree scale $w$ concentric with the axis of the base $a$. Alternatively, the degree scale $w$ may be fixed to the arm $q$, as in Fig. 5.

To enable the required relative motion of the pivot $i$ of the arm $m$ to be obtained this pivot is preferably arranged so as to work in a slot formed longitudinally in arm $y$ or in the central hub $y'$ of the arm as shown in Fig. 8. The pivot $i$ is rigidly connected to the degree scale $a'$ and its lower end is adapted to slide without rotating in a slot in a member $j$ (Fig. 8) which itself is constrained to have rectilinear motion only by means of suitable guides attached to the base $a$. The cursor $z$ is arranged to move longitudinally along the arm $y$ in unison with the pivot $i$. This construction has the effect of so mounting the arm $m$ that it is pivoted to and movable about the cursor $z$ of the arm $y$.

The graduated arms $q$, $d^2$, and $d$ are preferably attached to, or formed integrally with, saddles or slides arranged to slide round the rim of the base $a$ to which they may be clamped by means of screws $c^3$, $c^2$ and $c$ respectively. An opening is shown near the outer end of each arm and may be provided with a sighting blade or wire for the purpose of enabling the angular position of the arm to be determined either with relation to degree graduations formed on the flat bottom of the base or to degree graduations formed on the inner edge of the rim. The arm $y$ is preferably located by means of a hub $y'$ working in an opening in the base.

The cursors $r$ and $e$ may be clamped to their respective arms by screws $c^4$ and $f$ respectively. The link connection between the cursors may take the form of a pantograph $t$ between cursors $r$, $s$ and $l$ and of a slotted link, or blade, or telescopic link $g$, which may or may not be graduated, between the cursors $e$ and $l$. If desired the cursor $s$ may be arranged to be disconnected from the link mechanism, either by withdrawing the pivot or by providing a slot for the reception of the pivot as shown. A clamping screw $c^5$ (Fig. 7) may be provided to lock simultaneously the arm $y$, the cursor $z$, and the degree scale $a'$; an independent clamping screw $c^6$ (Fig. 7) may be provided to clamp simultaneously the arm $m$ and the cursor $l$ and the screw $c^7$ (Figs. 6 and 7) may clamp the link or blade $g$.

The manner of using the instrument shown in Figs. 6–8 is as follows:—

By flying over the datum ship on two courses the observer in the aircraft will be able to obtain observations of air speed, air course steered, and relative drift (that is to say, drift with relation to the datum ship). To work out the observations he first sets arm $y$ and cursor $z$ to represent the course and speed of the datum ship, and clamps them. He then sets and clamps arm $q$ to represent air course, cursor $r$ to represent air speed, and, by means of degree scale $w$, arm $d^2$ to represent relative ground course, on one course. Similarly he sets and clamps arm $d$ and cursor $e$ to represent air course and air speed respectively on the other course. Then, keeping cursor $s$ engaged with the pantograph $t$, he manipulates the elements $m$ and $l$ until the degree scale on cursor $e$ shows the remaining relative drift angle. The arm $m$ and the cursor $l$ will then indicate the true direction and speed of the wind. To obtain the true ground speed, it is now necessary to clamp the wind elements $m$ and $l$, and to bring the degree scale $a'$ to its zero position, concentric with the base, having first disengaged the cursor $s$. Arm $d^2$ and cursor $s$ are then manipulated until cursor $s$ can again be engaged with the pantograph, whereupon true ground speed can be read from cursor $s$, and true ground course from arm $d^2$.

Figure 3:
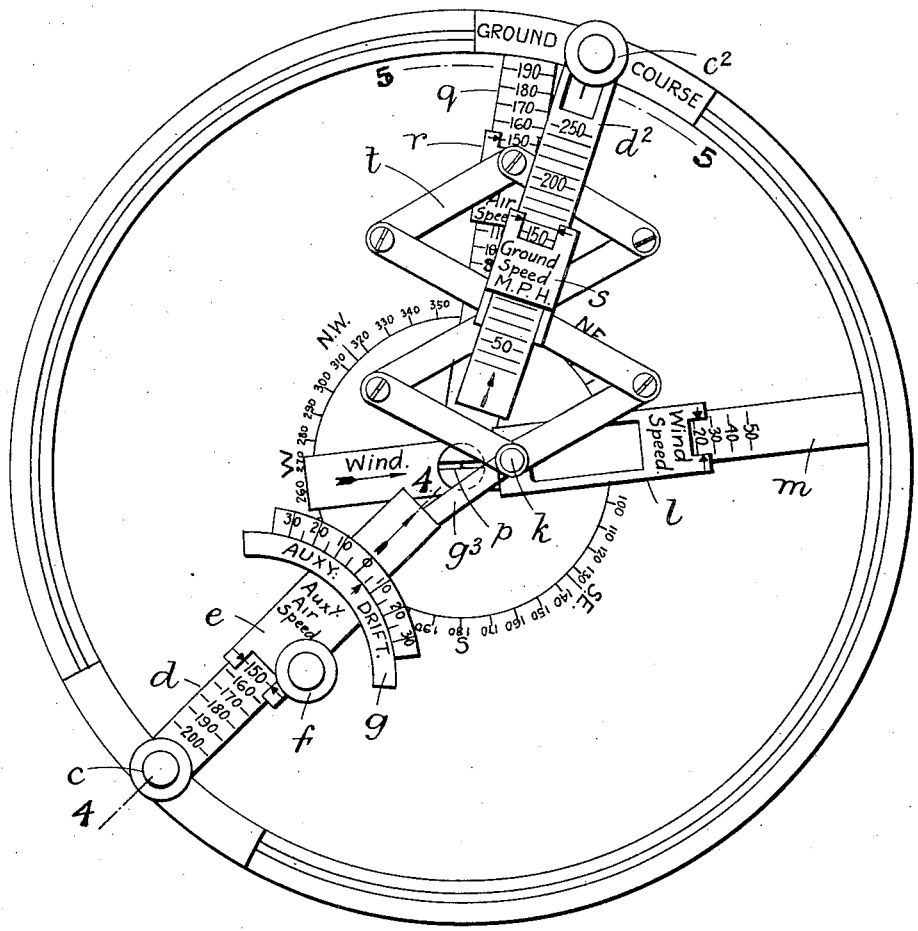
Fig. 3 is a top plan view of a modified form of the instrument shown in Fig. 1.
Figure 4:
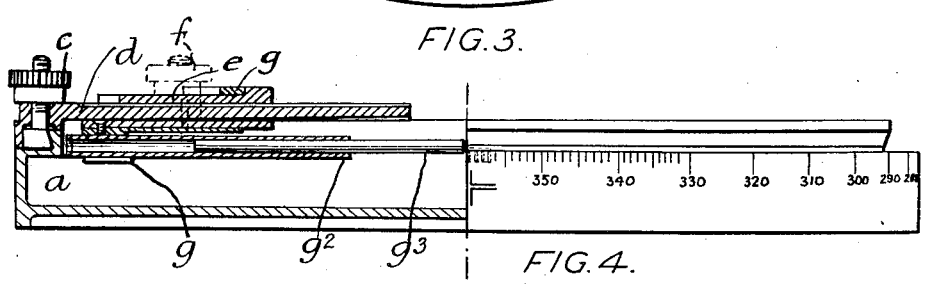
Fig. 4 is an elevation partly in section on the line 4—4 of Fig. 3.

When the degree scale $a'$ of this form of instrument is brought to zero position the instrument corresponds to that illustrated in Figs. 3–5.

If the instrument is required to indicate ground speed only, the arm $m$ and the cursor $l$ in Figs. 3, 4 and 5 may be dispensed with. For certain purposes the instrument, as used in connection with observation of drift with regard to a datum ship, may be constructed without the parts $c$, $d$, $e$, $f$, $g$ and $c^7$, in Figs. 6, 7 and 8.

In all forms of the instrument shown in the drawings, and hereinabove described, a number of arms are constrained in such a manner that each must always lie along a radius drawn from the centre of the base. This result may be achieved by pivoting the inner end or ends of any one or more of the arms at the centre of the base or by mounting the outer end or ends of one or more of the arms on a sliding saddle such as those described above and indicated in the drawings at $b$, $b'$, $b^2$, moving round a circular external rim or its equivalent, or by mounting the outer end of one or more of the said arms on a supporting arm which is itself pivoted at its inner end to the centre of the base.

What we claim and desire to secure by Letters Patent is:—

1. A navigating instrument comprising in combination, a graduated circular base, three graduated arms, means mounting said arms so as to extend radially of but be movable about the centre of the base, a cursor slidable on and along each of the arms respectively, and a pantographic device interconnecting the cursors and pivoted to each whereby the points of connection are maintained in a straight line, a fourth arm radially extending from and rotatable about the common centre, a cursor slidable on and along said fourth arm, a drift scale pivoted on said cursor, and a link connection between said scale and a piot point of said pantograph on one of said three first-named cursors.

2. A navigating instrument comprising in combination, a graduated circular base, four graduated arms, means mounting said arms so as to extend radially of but be movable about the centre of the base, a cursor slidable on and along each arm respectively, a degree scale attached to one of the arms and arranged concentric with the base, an auxiliary degree scale on the cursor of one of the other arms, a link connection between the cursors of all four arms, and clamping devices for clamping the cursors and scales in desired positions.

3. A navigating instrument comprising in combination, a graduated circular base, three graduated arms, means mounting said arms so as to extend radially of but be movable about the centre of the base, a cursor slidable on and along each of the three arms respectively, a pantographic device interconnecting the cursors and pivoted to each in such a way that the points of connection are maintained in a straight line, a drift scale attached to one of said arms, a fourth arm, means mounting this arm so as to extend radially of but be movable about the centre of the base, a cursor slidable on and along the fourth arm, a drift scale mounted on this cursor, a link connection between a pivot on this cursor and one of the pivots of the pantographic device, and clamping devices for locking the arms and cursors in desired positions.

4. A navigating instrument comprising in combination, a graduated circular base, three graduated arms, means mounting said arms so as to extend radially of but be movable about the centre of the base, a cursor slidable on and along each of the three arms respectively, a fourth arm pivoted to and movable about one of the said three cursors, a fourth cursor slidable on and along the said fourth arm, a pantographic device interconnecting the fourth cursor and two of the first-mentioned three cursors, means for disconnecting the pantographic device from the cursors at will, a degree scale on one of the arms carrying said two interconnected cursors, a circular degree scale concentric with the fourth arm and mounted upon the cursor carrying this arm, means for guiding this circular degree scale so that a given diameter thereof always remains parallel to itself, a fifth arm, means mounting the same so as to extend radially of but be movable about the centre of the base, a fifth cursor slidable on and along the fifth arm, a drift scale mounted on this cursor, a link connection between the fifth cursor and the pivot common to the fourth cursor and the pantographic device, and clamping devices for locking the arms, cursors, and scales, in the desired positions.

5. A navigating instrument comprising in combination, a graduated circular base, three graduated arms, means mounting said arms so as to extend radially of but be movable about the centre of the base, a cursor slidable on and along each arm, a degree scale attached to one of the arms and arranged concentric with the base, a fourth arm and a circular degree scale mounted upon the cursor of one of the arms not provided with the first-mentioned degree scale, means mounting the fourth arm on said last-named cursor so as to rotate about the centre of said circular degree scale, means for guiding this circular degree scale so that when displaced by the movement of the cursor carrying the same successive positions of a given diameter of the scale remain parallel to one another, a cursor slidable on and along the fourth arm, a link connection between this fourth cursor and the remaining two cursors, and means for disconnecting the link at will.

6. A navigating instrument comprising in combination a graduated circular base, three graduated arms, means mounting said arms so as to extend radially of but be movable about the centre of the base, a cursor slidable on and along each of the three arms respectively, a fourth arm pivoted to and movable about the third one of the said three cursors, a fourth cursor slidable on and along the said fourth arm, a pantographic device interconnecting the said fourth cursor and the first two of the first-mentioned three cursors, means for disconnecting the pantographic device from the cursors at will, a degree scale on one of the arms carrying the first and second cursors, a circular degree scale on the third cursor arranged to show the angular position of the fourth arm, means for guiding the said circular degree scale so that any diameter thereof always remains parallel to itself, and clamping devices for locking the arms, cursors, and scales in desired positions.

In testimony whereof we affix our signatures.

HERBERT ADDISON.
WILLIAM BLAINE LUARD.